(No Model.)

G. D. HAMPSHIER.
NUT LOCK.

No. 246,127. Patented Aug. 23, 1881.

Witnesses:
W. L. Langley.
A. E. Eader

Inventor:
George D. Hampshier
By his Atty
Chas. B. Mann

UNITED STATES PATENT OFFICE.

GEORGE D. HAMPSHIER, OF BECKLEYSVILLE, MARYLAND, ASSIGNOR OF ONE-THIRD TO WILLIAM MARSHALL, OF SAME PLACE.

NUT-LOCK.

SPECIFICATION forming part of Letters Patent No. 246,127, dated August 23, 1881.

Application filed July 1, 1881. (No model.)

*To all whom it may concern:*

Be it known that I, GEORGE D. HAMPSHIER, a citizen of the United States of America, residing at Beckleysville, in the county of Baltimore and State of Maryland, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a nut-lock of that class in which a threaded bolt provided with a groove extending across the threads and lengthwise of the bolt is employed.

Figure 1:
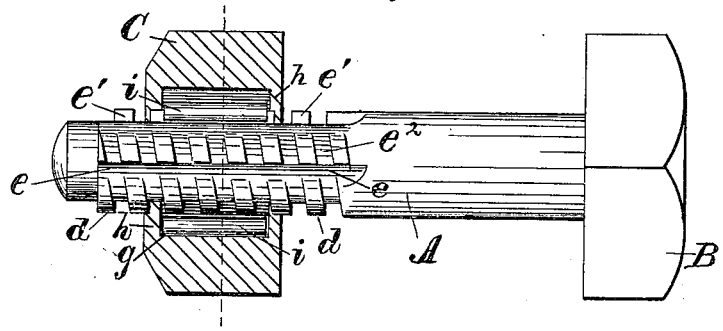
Figure 2:
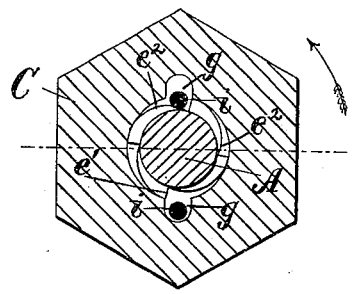
Figure 3:
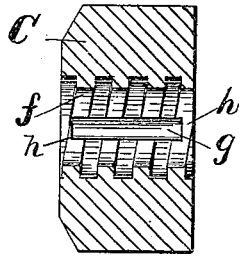

In the drawings hereto annexed, Figure 1 is a side view of the bolt with the nut in section. Fig. 2 is a cross-section of the bolt and nut on the line indicated in Fig. 1. Fig. 3 is a transverse or diametrical section of the nut on the line indicated in Fig. 2.

The letter A designates the bolt; B, its head, and C the nut. Extending lengthwise of the bolt and across the thread $d$ are one or more grooves, $e$. When considered in cross-section, one side, $e'$, of each groove is abrupt, or substantially radial to the axis of the bolt, while the other side forms a gradual taper from the deepest part adjoining the abrupt side to the outside face of the thread, as shown in Fig. 2. The nut is provided with the usual thread, $f$, and one or more grooves, $g$, are cut within the tap of the nut, and extend in a direct line therewith and across the thread, as shown. It will be noticed the grooves in the nut do not extend entirely through from one side to the other, but are closed at each end, as shown at $h$. Within each groove of the nut a loose pin, $i$, is placed, and the relative size of the pin and groove is such that when the nut is turned so that the grooves or one of them is immediately below the bolt the pin in said groove will, by lying in the bottom of the groove, wholly escape from the thread of the bolt, while when the nut is turned so that its grooves or one of them is immediately over the bolt the pin will drop into the groove $e$ on the bolt. Both of these described positions are shown in Fig. 2, the nut in this instance having two grooves and pins. In the first-described position the pin does not act as a lock, but in the latter position it does.

It will be seen that as one side of the groove of the bolt is abrupt and the other tapering the nut may be turned from left to right, as seen in Fig. 1, to screw it onto the bolt, because when so turned the loose pins in the nut will roll over or rise upon the tapered side of the groove and cross the outer face of the thread and will drop into the next groove.

When the nut has two grooves, and each groove is provided with a loose pin, and the bolt has several grooves, it will rarely happen that one or the other pin will not be in engagement with a groove on the bolt, and the only way a nut can be removed in such case is to knock it off or split it open; but if one pin only is employed in the nut the pin will serve to lock the nut whenever the position of the nut and bolt are such that the gravity of the pin will cause it to engage with a groove in the bolt. Now, in such case, if a bolt is employed which is round throughout its length, thereby admitting of being turned, the nut may be unlocked and removed by turning both nut and bolt to such position as will bring the groove of the nut below the bolt, when the pin in said groove will, by its gravity, drop out of engagement with the groove of the bolt and will lie in the bottom of the groove of the nut.

Having described my invention, I claim and desire to secure by Letters Patent of the United States—

A nut-lock consisting of a bolt across the thread of which is a straight groove, $e$, having one side abrupt and the other gradually sloping from the deepest part to the outside face of the thread, a threaded nut having a groove, $g$, within the tap extending across the thread, but not entirely from one side of the nut to the other, each end $h$ of the groove being closed, and a loose pin, $i$, placed within the said groove of the nut, as set forth.

In testimony whereof I affix my signature in presence of two witnesses.

GEORGE D. HAMPSHIER.

Witnesses:
CHAS. B. MANN,
JNO. T. MADDOX.